US011967238B2

(12) United States Patent
Churko et al.

(10) Patent No.: US 11,967,238 B2
(45) Date of Patent: Apr. 23, 2024

(54) VEHICLE PROXIMITY SENSOR AND ALERT SYSTEM

(71) Applicant: HEDS UP SAFETY INC., Haliburton (CA)

(72) Inventors: Stephen Paul Churko, Guilford (CA); Rachel Kellie Churko, Guilford (CA); Jason Tyler Griffin, Kitchener (CA); Joshua Kwan Ho Wong, Waterloo (CA); Timothy Mackay, Gatineau (CA); Thai Nguyen, Georgetown (CA); Mingxuan Wang, Milton (CA); Benjamin Altman, Mississauga (CA); Lawrence Sze-Heen Leung, North York (CA)

(73) Assignee: HEDS UP SAFETY INC.

( * ) Notice: Subject to any disclaimer, the term of this patent is extended or adjusted under 35 U.S.C. 154(b) by 48 days.

(21) Appl. No.: 17/663,389

(22) Filed: May 13, 2022

(65) Prior Publication Data

US 2022/0366793 A1 Nov. 17, 2022

Related U.S. Application Data

(60) Provisional application No. 63/268,003, filed on Feb. 15, 2022, provisional application No. 63/189,012, filed on May 14, 2021.

(51) Int. Cl.
*G08B 21/00* (2006.01)
*G08G 1/00* (2006.01)

(52) U.S. Cl.
CPC .................................... *G08G 1/20* (2013.01)

(58) Field of Classification Search
CPC ................................ G08G 1/20; G08G 1/166
USPC .......................................................... 340/901
See application file for complete search history.

(56) References Cited

U.S. PATENT DOCUMENTS

| | | | | |
|---|---|---|---|---|
| 5,739,768 | A * | 4/1998 | Lane | B61L 29/246 340/901 |
| 6,268,803 | B1 * | 7/2001 | Gunderson | G08G 1/166 340/436 |
| 6,470,002 | B1 * | 10/2002 | Jones | G08G 1/20 340/8.1 |
| 2006/0161341 | A1 * | 7/2006 | Haegebarth | G08G 1/20 701/117 |
| 2013/0300581 | A1 * | 11/2013 | Jenkins | G08G 1/166 340/903 |
| 2015/0228066 | A1 * | 8/2015 | Farb | G06V 20/58 348/148 |
| 2016/0260328 | A1 * | 9/2016 | Mishra | G01S 13/931 |
| 2016/0358477 | A1 * | 12/2016 | Ansari | G06Q 40/08 |
| 2018/0077524 | A1 * | 3/2018 | Post | H04L 67/52 |

(Continued)

*Primary Examiner* — Mark S Rushing

(57) ABSTRACT

A vehicle detection system warns snowmobilers of other approaching vehicles with potential risk of collision. To better prevent accidents, the system calculates collision risks and warns the rider based on level of risk. When riding in groups, a member can press a stop request button to ask the group to slow down. When a member exits the group, everyone in the group will receive a message, alerts or indication with the update. The vehicle detection system utilizes Bluetooth® low energy (BLE), LoRaWAN® technologies and/or global positioning system technologies and is designed to detect other devices in the region and use acquired information to calculate proximity and risk of collision.

20 Claims, 18 Drawing Sheets

(56) References Cited

U.S. PATENT DOCUMENTS

| | | | | |
|---|---|---|---|---|
| 2019/0122460 | A1* | 4/2019 | Reyes | G08G 1/162 |
| 2019/0311626 | A1* | 10/2019 | Clyne | B62J 45/41 |

* cited by examiner

VEHICLE PROXIMITY SENSOR AND ALERT SYSTEM

CROSS REFERENCE TO RELATED APPLICATIONS

The application claims priority to and the benefit of U.S. Provisional Patent Application Ser. No. 63/189,012, entitled "VEHICLE PROXIMITY SENSOR AND ALERT SYSTEM", filed on May 14, 2021, U.S. Provisional Patent Application Ser. No. 63/268,003, entitled "VEHICLE PROXIMITY SENSOR AND ALERT SYSTEM", filed on Feb. 15, 2022, the disclosures of which are incorporated herein by reference in their entirety.

BACKGROUND

The embodiments described herein relate to the field of collision avoidance systems and more specifically relates to a proximity sensor and alert system particularly for use with snowmobiles and off-road vehicles.

A snowmobile is a motorized vehicle operated on snow and ice, and mostly driven on open terrain or trails. As a result of their inherent maneuverability, acceleration, and high-speed abilities, skill and physical strength are both required to operate a snowmobile. Losing control of a snowmobile can easily result in serious damage, injury and even death. One such cause of loss of control is due to a collision with an obstruction. FIG. 1 is a diagram illustrating a snowmobile accident.

Many snowmobile-related deaths occur when drivers collide with trees, groomers, and other snowmobiles. The hazard level for snowmobile riders is particularly high as due to the high-speed abilities of snowmobiles and limited visibility on trails, the amount of time to react to obstructions is reduced.

Snowmobiles and off-road vehicles such as all-terrain vehicles (ATVs) exhibit a safety problem whereby riders may be injured and possibly killed in accidents during rides. Snowmobilers are struggling to receive timely warnings of other riders that are at risk of colliding with them. This is especially dangerous at high speeds when riding over a hill and when turning a sharp blind corner with limited visibility. Furthermore, there is no warning for areas with limited visibility and there are dangers of colliding with other snowmobiles while riding at high speed.

Furthermore, these vehicles also exhibit a visibility problem whereby there is no visibility of one's own group when riding. There is no visibility of members in your own group and no way of letting the leader know that they are riding too fast. The leader has no way of knowing when a group member is falling behind or in distress. Often, the group would have to stop at the next stop point to wait for someone to catch up. Contact with the rest of the group can be made even more challenging with limited cellular reception in some remote areas.

There is a desire for a reliable collision avoidance system for off road vehicles (e.g., snowmobile and all-terrain vehicles (ATVs) to avoid the above-mentioned problems.

SUMMARY

A vehicle detection system warns snowmobilers of other approaching vehicles with potential risk of collision. To better prevent accidents, the system calculates collision risks and warns the rider based on level of risk. When riding in groups, a member can press a stop request button to ask the group to slow down. When a member exits the group, everyone in the group will receive a message, alerts or indication with the update. The vehicle detection system utilizes Bluetooth® low energy (BLE), LoRaWAN® technologies and/or global positioning system technologies and is designed to detect other devices in the region and use acquired information to calculate proximity and risk of collision.

DETAILED DESCRIPTION

Figure 1:
FIG. 1 is a diagram illustrating a snowmobile accident.

According to embodiments of this disclosure, a vehicle detection system is disclosed that aims to prevent vehicle collisions of off-road vehicles such as snowmobiles and all-terrain vehicles (ATVs). The vehicle detection system allows visibility into other riders in the surrounding environment, as well as, those within their group.

Objectives:

According to aspects of this disclosure, a vehicle detection system for snowmobiles is disclosed as a collision prevention warning system with the following objectives:

- Snowmobile riders will carry a device with Bluetooth®/LoRaWAN® chip, global positioning system (GPS) or connectivity to satellite communications systems or cellular networks
- Device warns users based on distance (and relative speed) of other devices detected (by establishing a mesh network when devices approach each other and auto-adjust the network once a device moves out of range).
- Be able to give enough warning to users given reasonable reaction time.
- Incorporate LoRa® to increase range of detection and used as device-to-device communication mitigate latency (caused by advertisement/handshake/info exchange, etc.).
- Warn users of oncoming vehicles from all directions.
- Be able to reliably detect other devices over hills, around corners, and in obstructed environments (lots of trees and vegetation) using device-to-device network or Bluetooth® mesh
- Operate in Snow and extreme temperatures (snow and cold).

Group Pairing Features:

According to aspects of this disclosure, the vehicle detection system will also have group pairing features, including the following aspects:

Vehicle Approaching Scenarios
- Exploring ability to assess directionality.
- Two directional or multi-directional lights, light flashes as vehicle approaches.
- Line of LEDs, lights turn red as vehicle approaches closer, the LEDs could have an embodiment as either line and ring LEDs configurations.

Members in Range
- LEDs indicators to indicate number of members within a group.
- Associating/pairing devices at the beginning of the ride to note when riders drop in and out of range.
- Could offer insights, assurances, or opportunities otherwise unknown.

Members in Range
- Send "Stop" notification to group members as they come in range.
- Option to send stop request when needed to group members within range.
- Important for slower or rear riders to let those ahead know of need for a stop.

LoRaWAN® Integration
- Mitigate detection latency and delivering warnings to user with sufficient reaction time to prepare for potential collision.
- Having more members within range when SOS signal is sent in case of emergency.
- When SOS button is pressed, a general signal beacon is sent to any device within range independent of their grouping status.
- Allowing group members to move further away without losing pairing connection.
- LoRaWAN® is ideal for long range (0-20 km+), low power asset tracking (approx. 4-8 hours of battery life using 2AAs).

Hardware:

According to aspects of this disclosure, the hardware for this system includes the following:
- LED warning/direction light
- Buttons (Power, Reset, SOS, Stop Request)
- Main printed circuit board (PCB) & antenna
- Communication Technology (Bluetooth® and LoRa®)
- Gyroscope
- Global positioning system (GPS)
- Accelerometer
- Lidar (optional)
- Charging: USB-C
- Firmware Updates method: TBD
- Battery (replaceable)
  - Min 2 lithium Thionyl Chloride (Li SOCL2) batteries ability to withstand harsh temperatures
  - Prismatic batteries (37 mm×50 mm×8 mm provides ~2500 mAh)

Figure 2A:
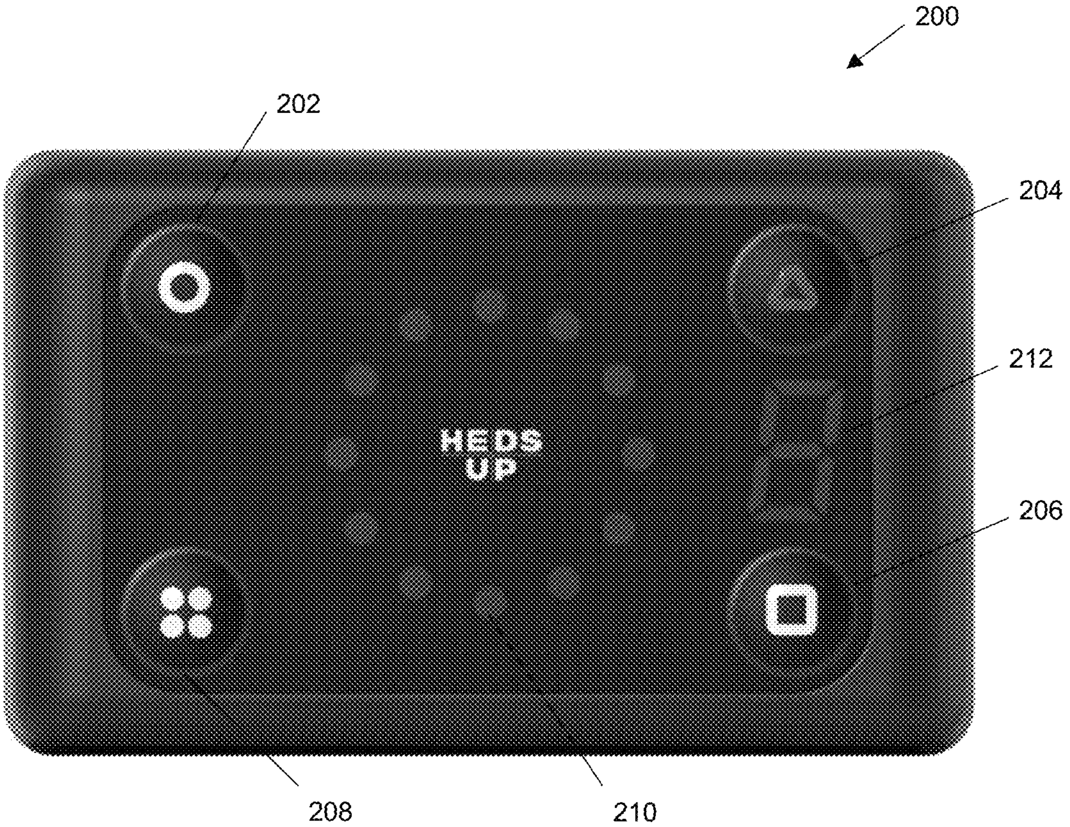
FIGS. 2A to 2C are diagrams illustrating an exemplary vehicle detection system.
Figure 2B:
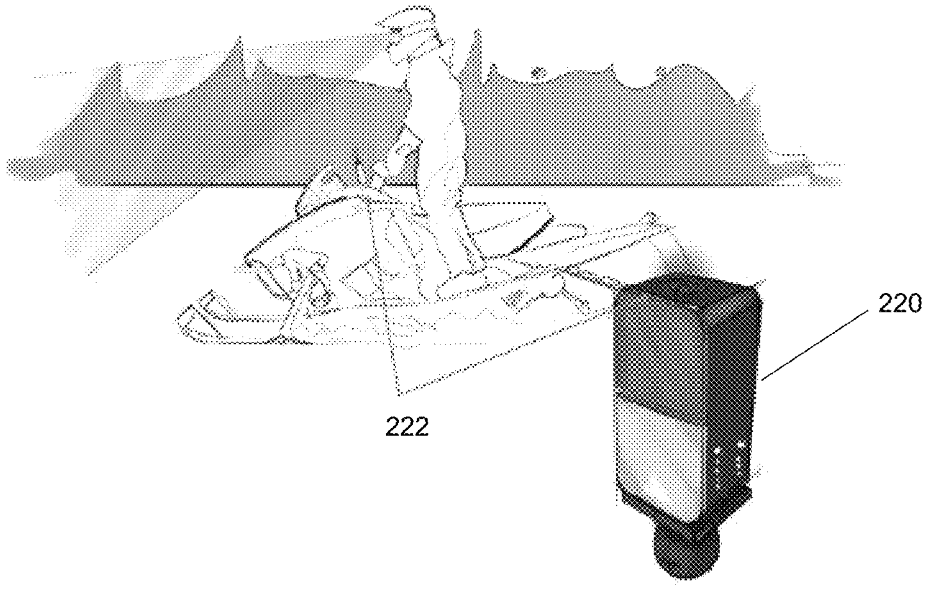
Figure 2C:
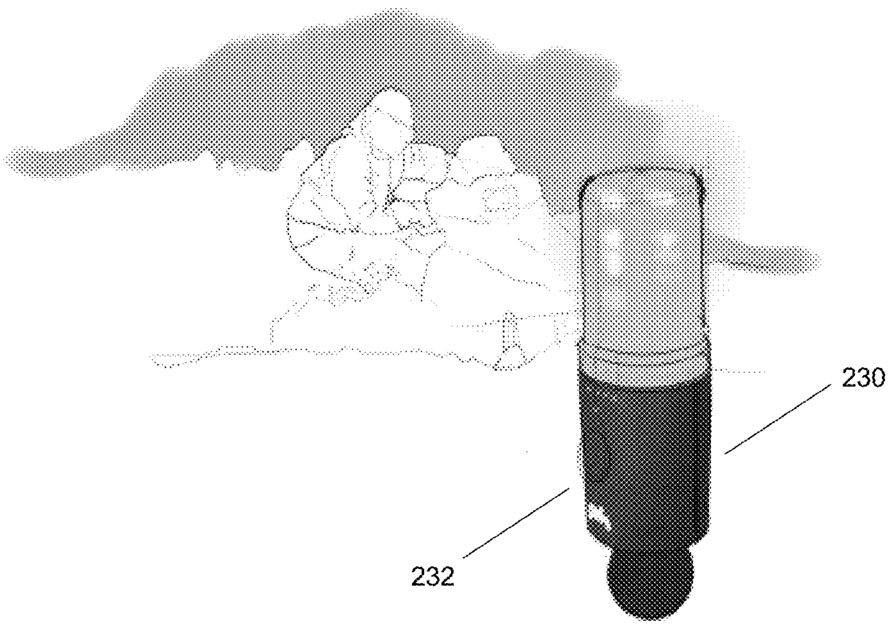

FIGS. 2A to 2C are diagrams illustrating an exemplary vehicle detection system. FIG. 2A illustrates an exemplary vehicle detection device display panel or alert device. Device display panel 200 consists of buttons 202, 204, 206 and 208. Device display panel 200 also has LED 212 and 210 whereupon LED 212 may be used to show numeric numbers (e.g., speed or codes) and LED 210 may be used to show color symbols or notifications.

FIG. 2B illustrates a LED notification light. According to FIG. 2B, device display panel 220 consists of light emitting diodes (LEDs) 222 mounted on top of the device 220 to alert the rider when they are standing.

FIG. 2C is a further embodiment that illustrates an alternate LED notification light. According to FIG. 2C, alternate LED notification light 230 consists of a 360 degrees LED array 232 shown with a threaded cover.

Figure 3:
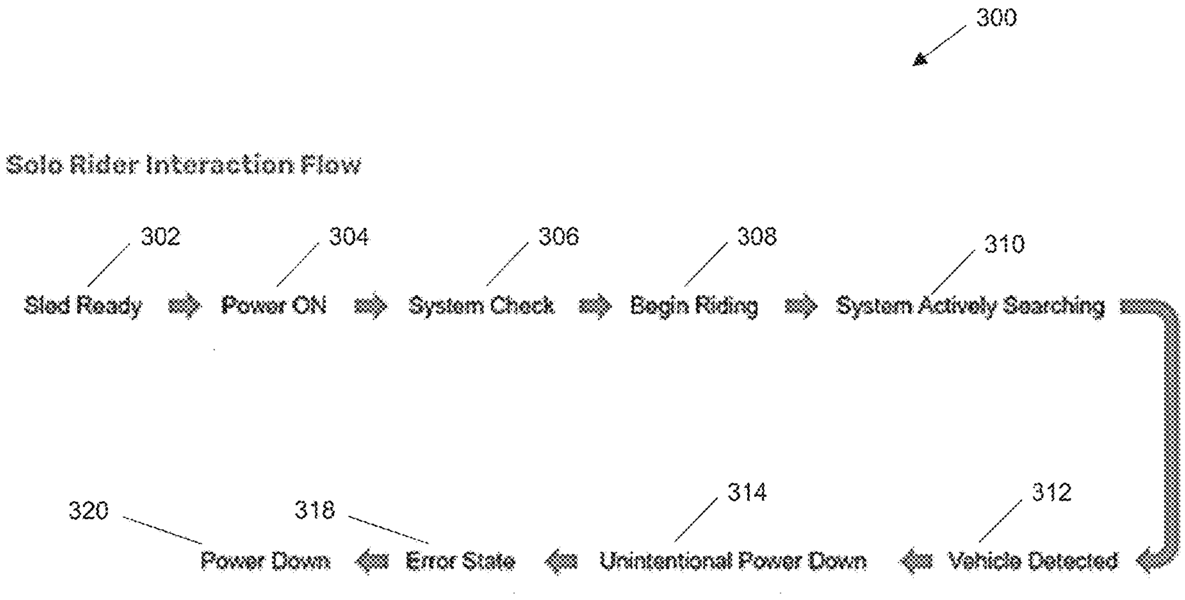
FIG. 3 is a diagram illustrating a solo rider interaction workflow.

FIG. 3 is a diagram illustrating a solo rider interaction workflow. According to FIG. 3, solo rider interaction workflow 300 starts with determining whether the snowmobile (or sled) is ready at step 302. Next, the device is powered on at step 304 based on the appropriate power on sequence (e.g., press/hold power button for 2 seconds). The LED will also start up.

Next is to perform a System Check at step 306 whereby the vehicle notification system will alternate colors for the LED. Thereafter, the rider will begin riding at step 308. The system will be actively searching at step 310 whereby the LEDS of the system will be illuminated solid green or yellow (most visible in daylight).

If a vehicle is detected at step 312, the LEDS will be responsible for detection and flashed solid red with flashing center LED, indicating that a vehicle is approaching. If there is an Unintentional Power Down at step 314, there will be an immediate device state change and it will require an action.

In a preferred embodiment, if there is an Error state at step 318 such as a Bluetooth® issue or battery level low, an indication or state change is required. Finally, if a Power Down event is detected at step 320, an LED power down sequence is initiated.

Figure 4:
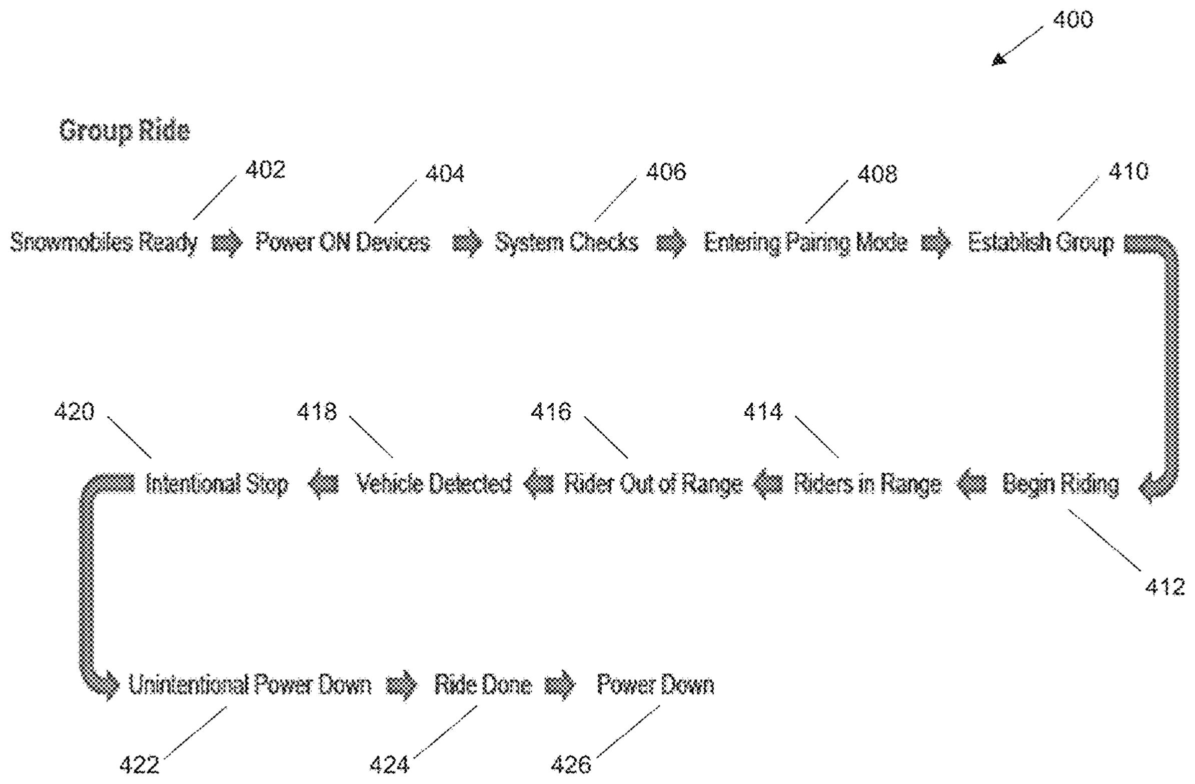
FIG. 4 is a diagram illustrating a group rider interaction workflow.

FIG. 4 is a diagram illustrating a group rider interaction workflow. According to FIG. 4, the Group Ride workflow 400 begins with snowmobiles being ready at step 402. The snowmobiles are Powered On at step 404 and System Checks occur at step 406. The next interactions for these will be the same as these events in FIG. 3. The next step is to Enter Pairing Mode at step 408 whereby one needs to press pairing button to start searching nearby Bluetooth® devices (i.e., search for unique Bluetooth® IDs).

According to FIG. 4, the next step is to Establish Group at step 410 whereby paired devices establish groups used to identify out of range riders and isolate riders within visible range from detection. Thereafter, the group will begin riding at step 412.

The next step is to determine whether Riders are in Range at step 414 whereby LED notifications are used to notify that all riders are within range. This may be a dedicated feature valuable to tour providers or for riders on a new or in dangerous conditions.

The next step is to detect whether Riders are Out of Range at step 416. This may be selectable based on the frequency of this event and the state change to indicate a member(s) are out of range. Furthermore, the rest of the state interactions (i.e., Vehicles detected at step 416, Intentional Stop at step 420, Unintentional Power Down at step 422, Ride Done at step 424, and Power Down at step 426) will be similar to interactions disclosed in FIG. 3.

Figure 5:
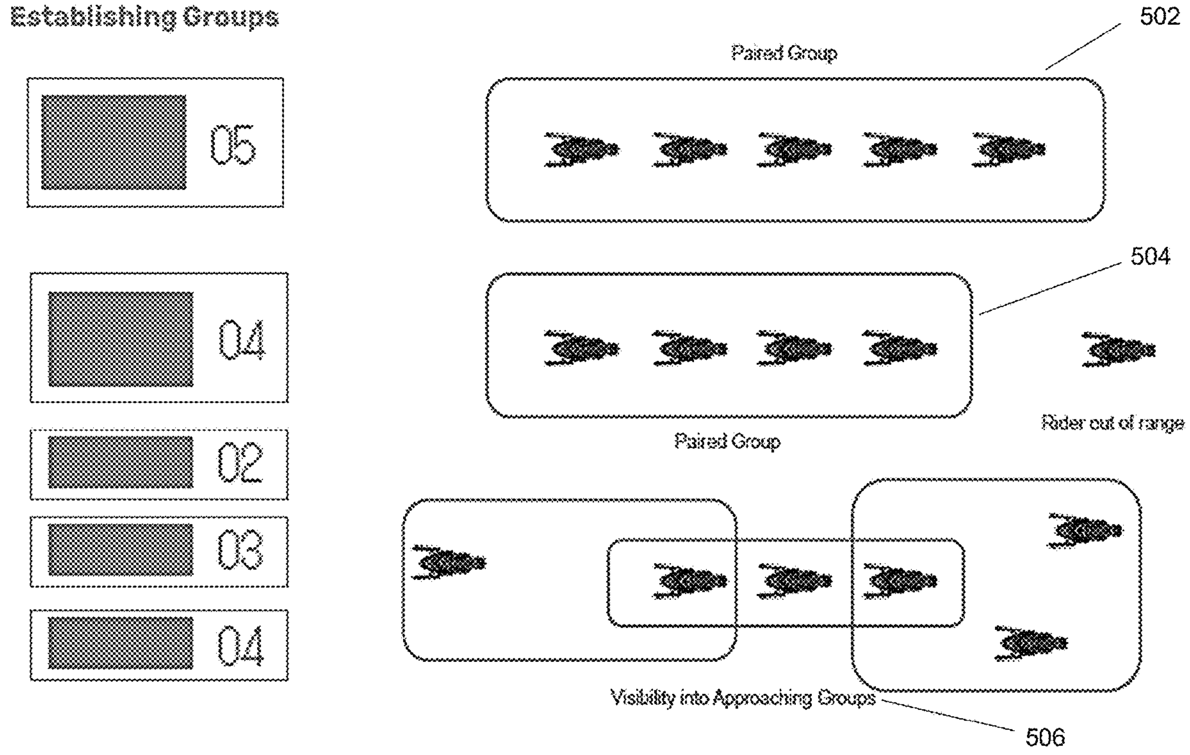
FIG. 5 is a diagram illustrating establishing groups in a group ride.

FIG. 5 is a diagram illustrating establishing groups in a group ride. According to FIG. 5, the Paired Group shows a group of 5 riders with no approaching vehicles 502. No warnings are given within the group. The middle right diagram 504 shows a group where one of the riders is out of range with 4 riders in a Paired Group. Currently, grouping is done statically (manual grouping+ungrouping), but future plans for the product include making dynamic grouping a possibility where if a rider drops out of range for an extended amount of time, the device automatically takes that rider out of the group.

According to FIG. 5, the bottom right diagram 506 shows a Paired Group of 3 where not all riders have the same visibility into approaching vehicles. Mesh networks allow communication within the group and to have better visibility into approaching vehicles in situations like this.

Figure 6:
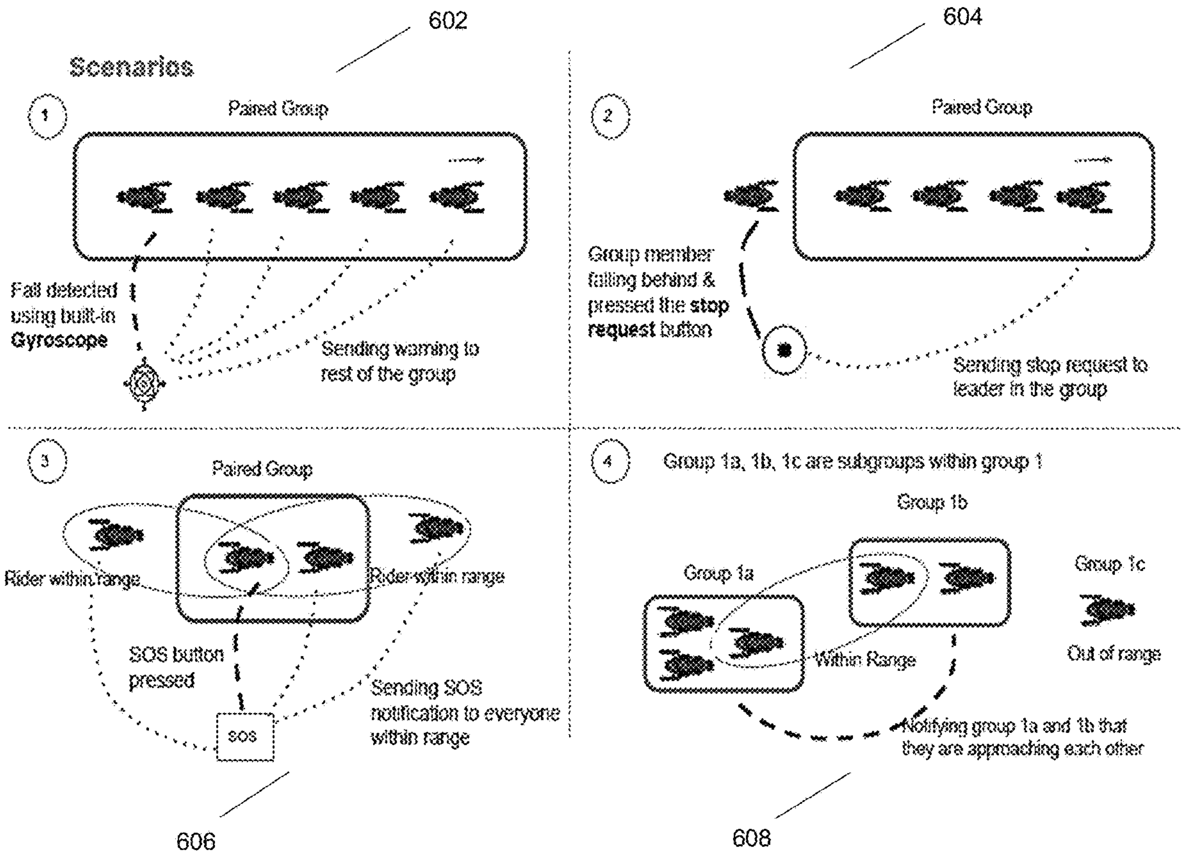
FIG. 6 is a diagram illustrating different scenarios in a group ride.

FIG. 6 is a diagram illustrating different scenarios of a group ride. According to FIG. 6, four paired group scenarios are described in detail. In scenario 1 (602), a fall is detected using a built-in gyroscope from one of the group vehicles where a warning is sent to the rest of the group members.

In further embodiments, it could be useful to know from the accelerometer if someone in the group has turned their engine off, which might happen in an accident, mechanical problems, or just stopping to take a picture, or many other things. This can be detected through the accelerometer. In further embodiments, a signal that a snowmobile in the group is not moving can be provided for electric snowmobiles or vehicles.

According to scenario 2 (604), a group member is falling behind and pressing the stop request button. The stop request is sent to the group leader to make necessary decisions (i.e., slow down or stop the group ride).

According to scenario 3 (606), an SOS button is pressed and the SOS notification is sent to everyone within range. All group riders within range will receive this and appropriate actions will be taken accordingly.

According to scenario 4 (608), the group is sub-divided into subgroups (e.g., subgroups 1*a*, 1*b*, 1*c*). Subgroups that are within range (i.e., group 1*a* and 1*b*) will notify each group (i.e., group 1*a* and 1*b*) that they are approaching each other. The out-of-range group (i.e., group 1*c*) will not receive this notification.

Figure 7:
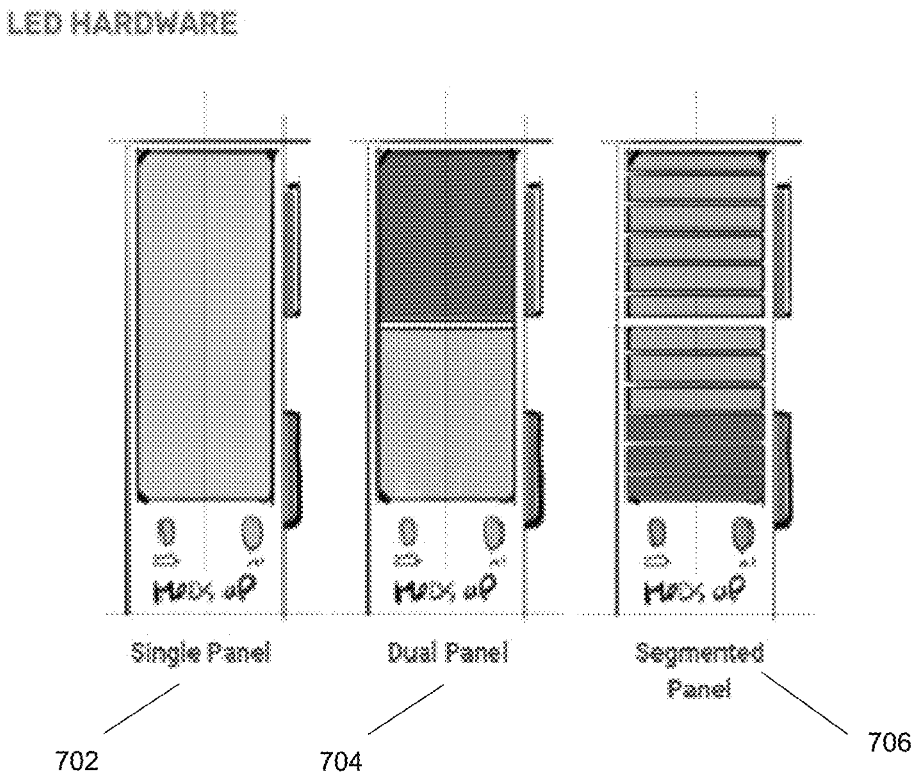
FIG. 7 is a diagram illustrating LED hardware panel.

FIG. 7 is a diagram illustrating LED hardware panel. According to FIG. 7, different display panels may be used and may exhibit the following characteristics:

Single Panel (702)
- Does not distinguish between oncoming traffic in front or behind rider.
- Low interpretation: Illuminates based solely on detection in range. When illuminated rider slow downs and scans the entire surrounding.

Dual Panel (704)
- Distinguishes between oncoming and rear traffic.
- Does not detect proximity to rider. When illuminated, rider interprets, slows down and looks appropriately.

Segmented Panel (706)
- Distinguishes between oncoming and rear traffic and detects proximity.
- Higher degree of interpretation and perceived value.

Figure 8:
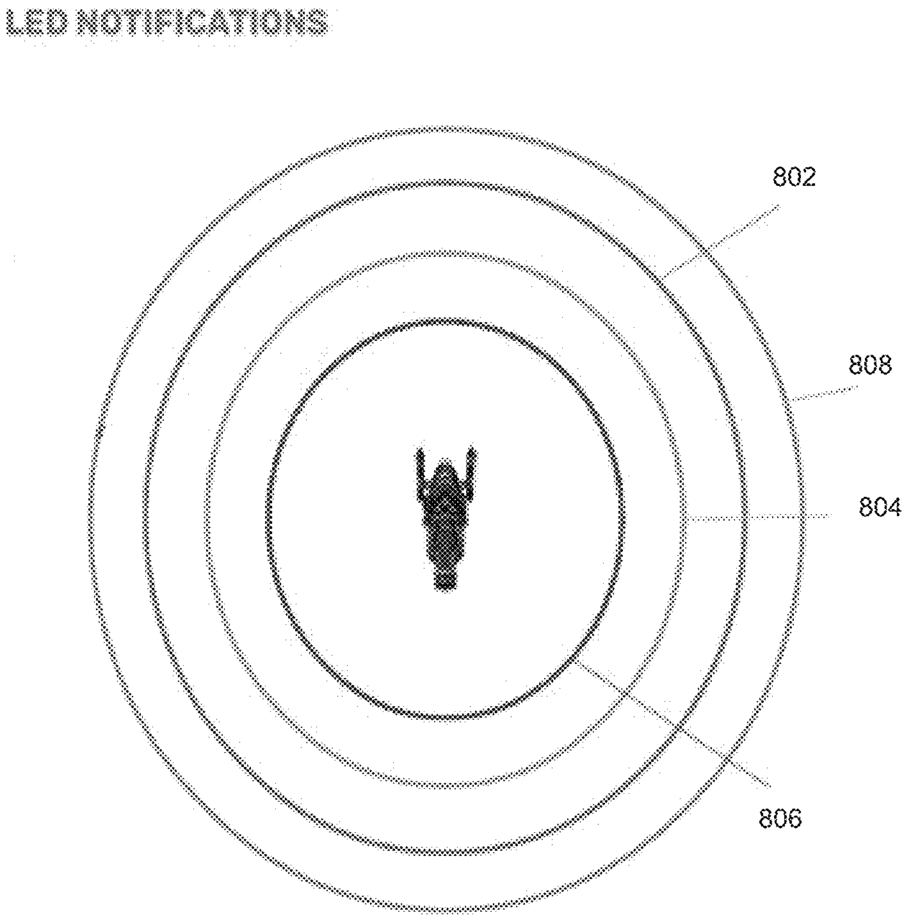
FIG. 8 is a diagram illustrating active searching of LED notifications.

FIG. 8 is a diagram illustrating active searching of LED notifications. According to FIG. 8, concentric colored rings are shown for different types of notifications, including max detection range using LoRA® (outermost ring), no detection using Bluetooth® ($2^{nd}$ outer ring), max detectable ring ($2^{nd}$ inner ring), and immediate detectable range (innermost ring).

More info on these rings are as follows:

No Detection in Range using Bluetooth® (802)
- Solid Green.
- Constant feedback that the device is functioning.
- Will need to calculate the impact this has on battery life.

Max Detectable Range (804)
- Solid Red or Amber.
- State Change to alert rider.

Immediate Detectable Range (806)
- Flashing Red (high frequency).
- Flashing to alert the rider of immediate traffic.
- Estimated Range (speed/time/human element).

Max Detectable Range Using LoRA® (808)
- Solid Gray.

Figure 9:
FIG. 9 is a diagram illustrating the exemplary solution used with trail mapping.

FIG. 9 is a diagram illustrating the exemplary solution used with trail mapping. According to FIG. 9, this concept device 900 explores the idea of proximity to the rider and the location of oncoming sleds. When looking at trail maps and systems, the organic nature of these routes really challenged this idea. If coming around a large bend both riders are traveling in a similar direction, before the system detects 'oncoming' the opposing rider could be very close. There is perceived value with denser information including explorations into radial segmentation (if angle is detectable) and Zones of Detection.

Figure 10:
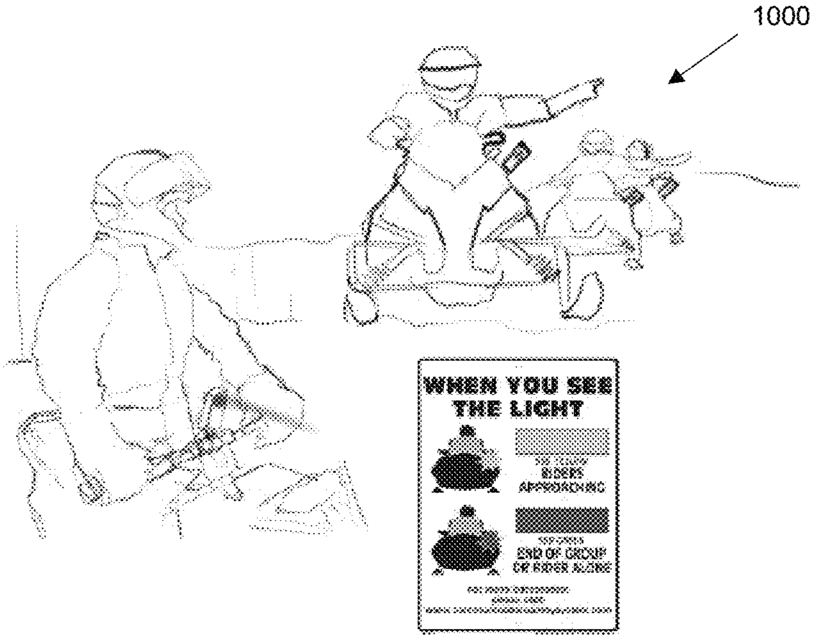
FIGS. 10 to 15 are diagrams illustrating additional explorations of a vehicle detection system.
Figure 11:
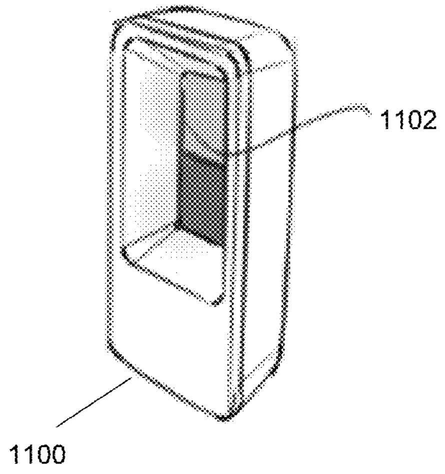

FIGS. 10 to 15 are diagrams illustrating additional explorations of the vehicle detection system. FIG. 10 is a diagram illustrating a vehicle detection system 1000 where an amber (or yellow) light indicates that a rider is approaching and a green light in a group indicates a rider is alone or is at the end of group of riders. FIG. 11 is a diagram illustrating an embodiment of a vehicle detection system with a panel device 1100 with recessed walls 1102 wherein the LED is visible in direct sunlight.

Figure 12:
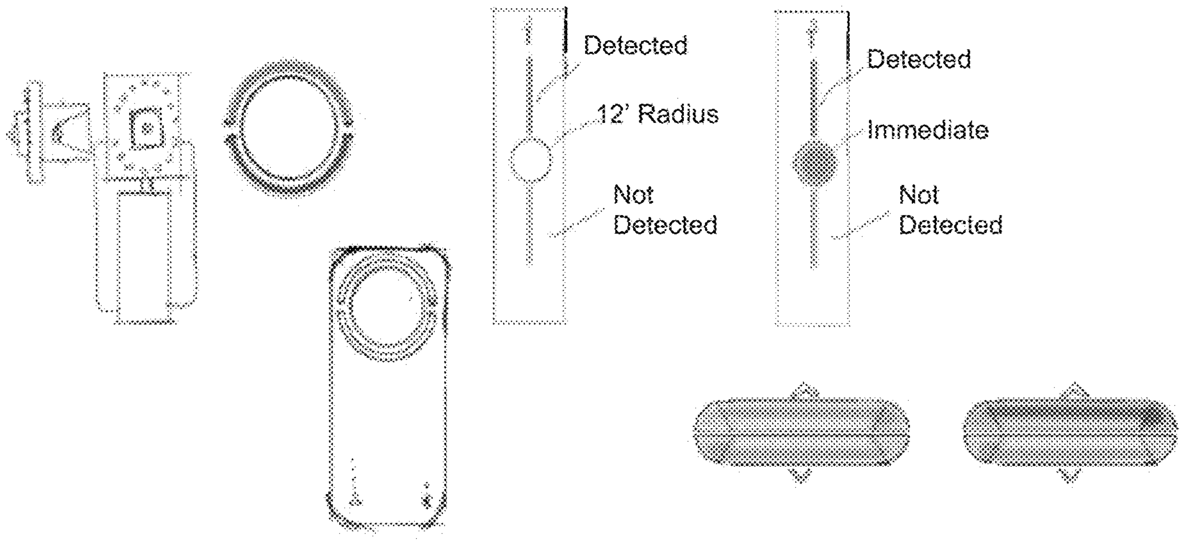

FIG. 12 shows an additional embodiment exploration in terms of directionality of approach. Semi-circles, center circle+lines above and below or semi-slot shapes can be used to indicate directionality of approach (front or behind). Different colors can be used to indicate urgency of warning.

Figure 13:
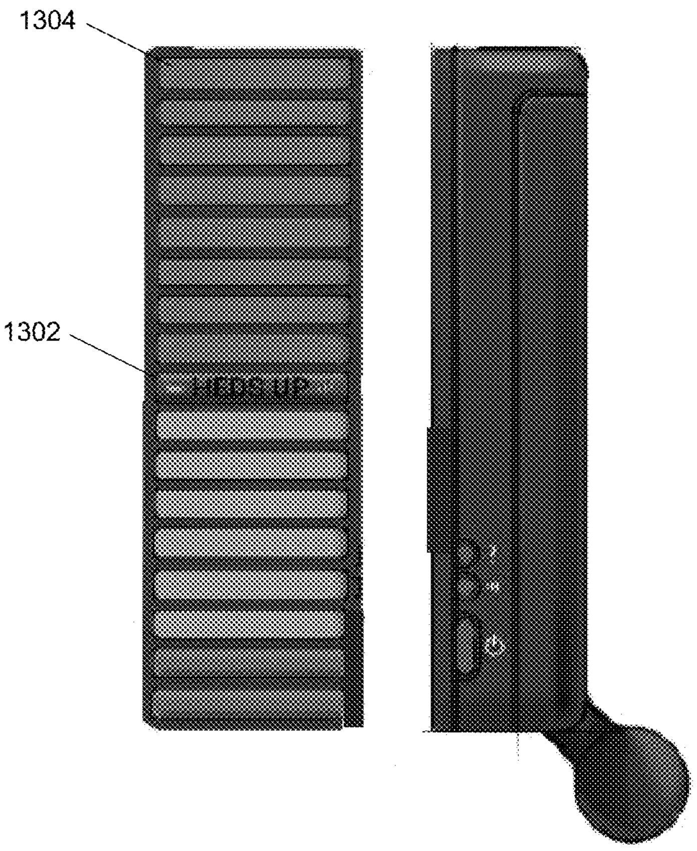

FIG. 13 shows another embodiment for showing directionality of approach. According to FIG. 13, branded button 130 (i.e., HEDS UP) can be a power button. Furthermore, LEDs can be segmented into multiple strips 1302 where each one can be used to indicate the proximity (each LED segment corresponding to a set value of distance) of the approaching vehicle and whether it's from front or behind the rider. For example, first LED means 200 m away, 2 LED lit up means 175 m, when 8 LEDs show up, the approaching vehicle is directly in front of the rider. Similarly for the other half of LED segments but showing approaching vehicle from behind.

Figure 14:
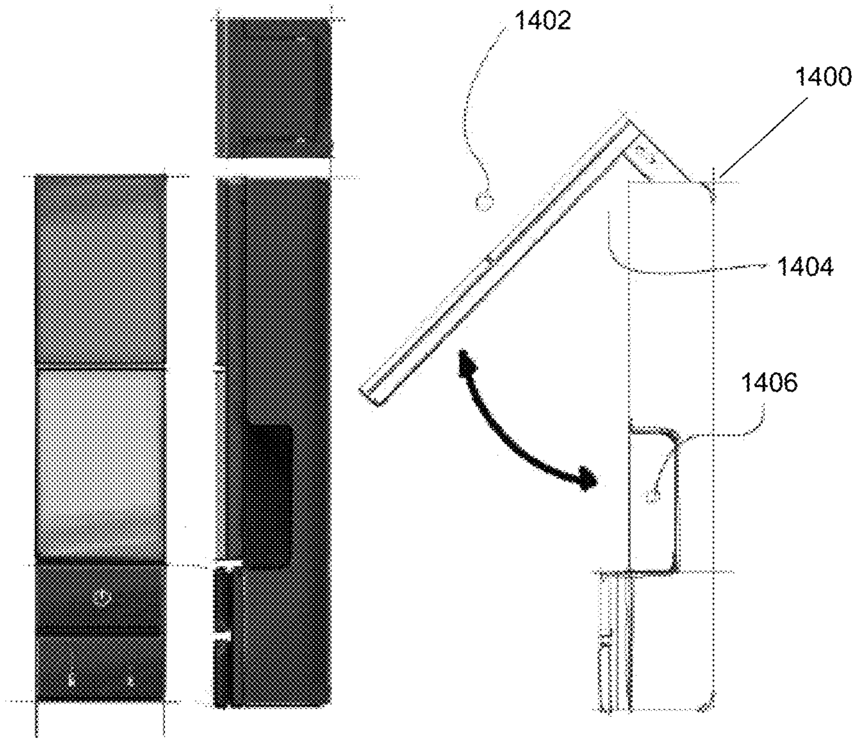

FIG. 14 is a diagram illustrating a vehicle detection apparatus 1400 having hinged display panel wherein the hinged display panel 1402 can be positioned in different angles based on the rider position. The friction hinge 1404 may be locked in two or more positions. There may also be a recess 1406 in the vehicle detection apparatus 1400 to secure the hinge display panel in place.

Figure 15:
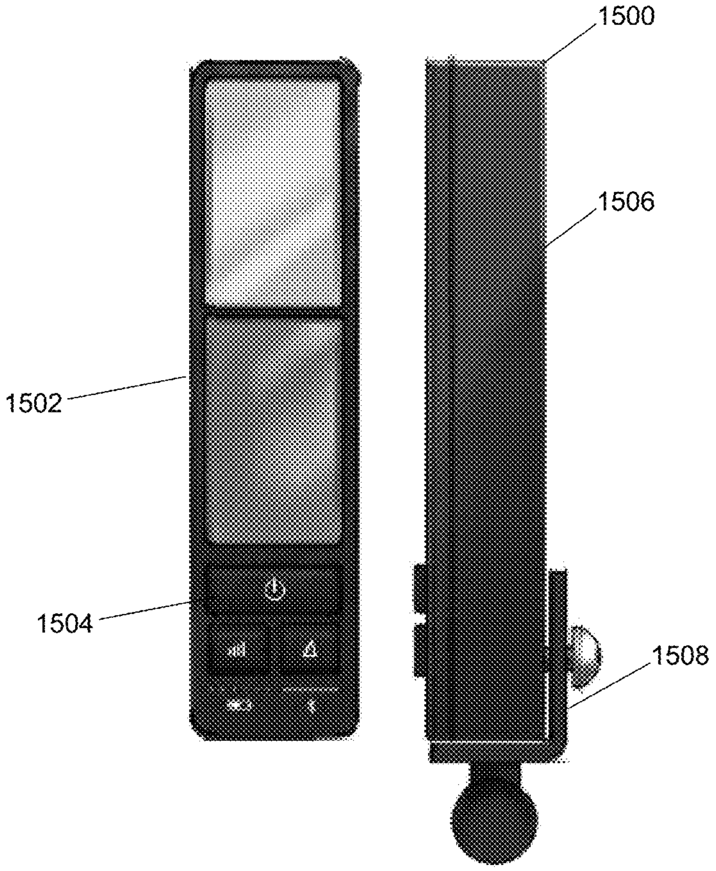

FIG. 15 is a diagram illustrating the front and side view of an exemplary vehicle detection apparatus 1500. According to FIG. 15, the front of the apparatus 1500 has a large illuminated display panel 1502 with large clickable buttons 1504 that are sized and spaced for glove use. According to the side view of FIG. 15, the apparatus has a battery pack 1506 with easy battery access and a mountable ram mount 1508.

A vehicle detection system having hinged display panel wherein the hinged display panel can be positioned in different angles based on the rider position. The friction hinge may be locked in two or more positions. There may also be a recess in the vehicle detection apparatus to secure the hinge display panel in place.

Figure 16:
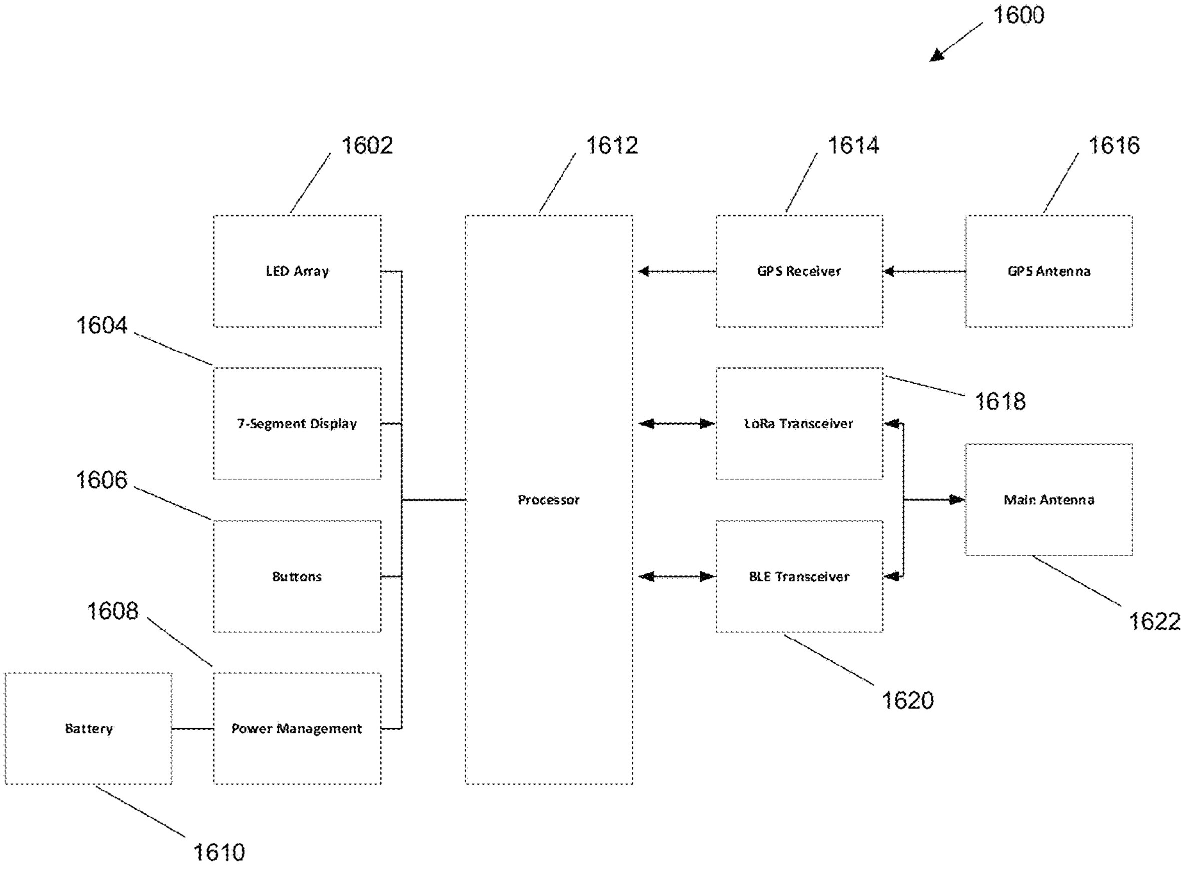
FIG. 16 is a block diagram illustrating a hardware architecture of an exemplary vehicle detection system.

FIG. 16 is a block diagram illustrating a hardware architecture of an exemplary vehicle detection system. This architecture describes the hardware implementation on how each module interacts with each other. According to FIG. 16, the vehicle detection system 1600 consists of such modules as LCD Array 1602, 7-Segment Display 1604, Buttons 1606, Power Management 1608, Battery 1610, Processor 1612, GPS Receiver 1614, GPS Antenna 1616, LoRA® Transceiver 1618, Bluetooth® Low Energy (BLE) Transceiver 1620 and Main Antenna 1622.

According to FIG. 16, Main Antenna 1622 consists of LoRA® Transceiver 1618 and Bluetooth® Low Energy (BLE) Transceiver 1620 which both connection bi-directionally to Processor 1612. Furthermore, GPS Antenna 1616 consists of GPS Receiver 1614 and also connects to Processor 1612.

According to FIG. 16, Battery 1610 connects to Power Management module 1608 which also connects to Processor 1612. Furthermore, modules LCD Array 1602, 7-Segment Display 1604, Buttons 1606 also independently connect to Processor 1612.

Figure 17:
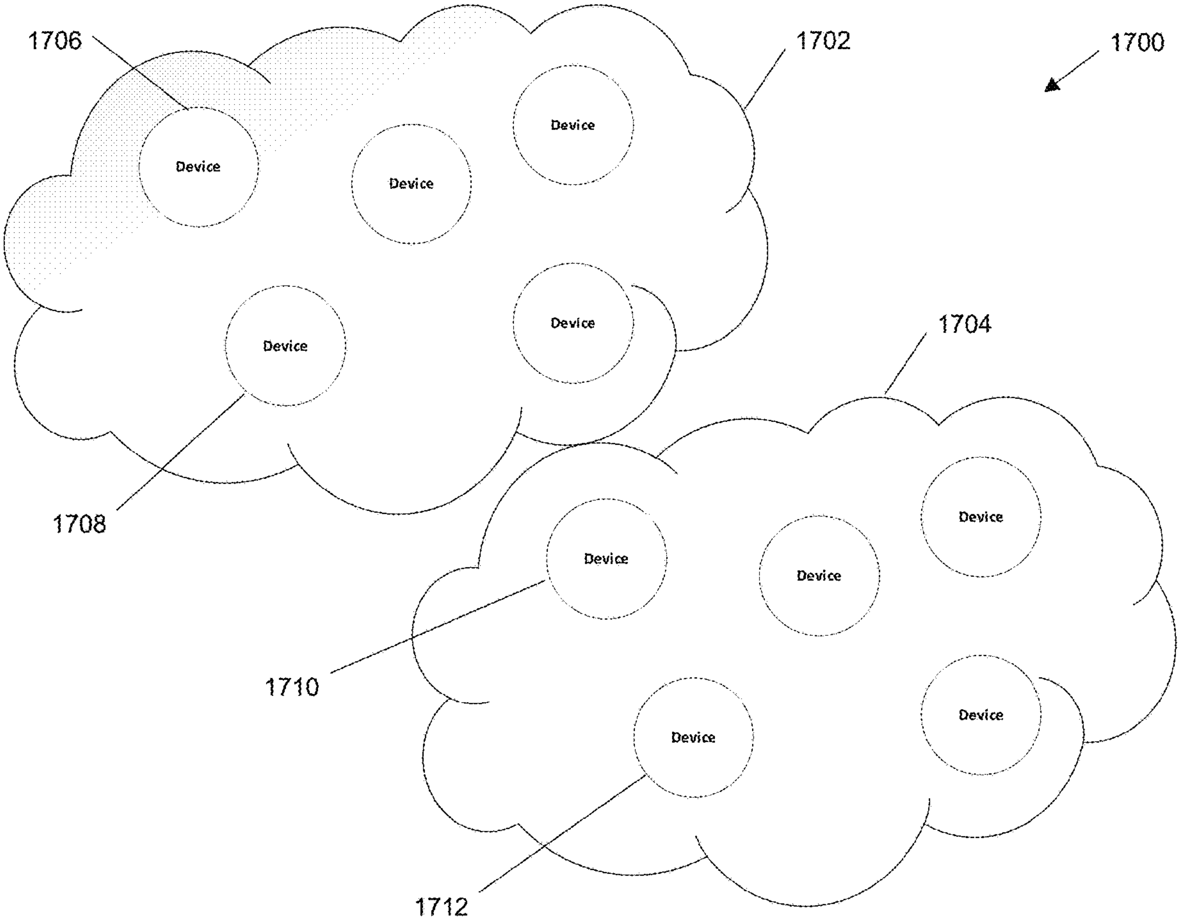
FIG. 17 is a block system diagram illustrating an exemplary vehicle detection system.

FIG. 17 is a block system diagram illustrating an exemplary vehicle detection system. According to FIG. 17, vehicle detection system 1700 consists of two or more multi-subnet MANETs 1702 and 1704. MANETs are mobile ad hoc networks comprised of mobile wireless nodes. Given the mobile nature of the nodes, the network topology can change over time. The nodes create their own network infrastructure: each node also acts as a router, forwarding traffic in the network. MANET routing protocols need to adapt to changes in the network topology and maintain routing information, so that packets can be forwarded to their destinations. Although MANET routing protocols are mainly for mobile networks, they can also be useful for networks of stationary nodes that lack network infrastructure.

Multi-subnet MANETs 1702 and 1704 consist of a plurality of devices 1706, 1708, 1710 and 1712. These devices may include vehicle detection apparatus to track each unique vehicle (i.e., snowmobiles or ATVs) configured to connect to the vehicle detection system 1700.

Handsfree LED to Replace Hand Signals

In further embodiments, a feature such as handsfree LED to replace hand signals can be deployed. According to this feature, when riders are in a group and are passing other sleds (snowmobiles), the rider uses hand signals to let them know that there are more sleds coming behind the rider with a thumb or waving signal saying there are more behind or the rider holds up a number of fingers to tell them exactly how many more sleds are in their group. When the rider is the last sled of the group, the rider holds up their arm down with a closed fist to let them know they are the last one of the group.

According to the disclosure, the handsfree LED concept is to replace the hand signals with a light or screen on the snowmobile. This light or screen communicates the same message as the hand signals; for example, more sleds are coming behind, or how many sleds are coming behind, and when the last sled is in the group. Part of the advantage to the snowmobiler is being able to keep both hands on the handlebars for better control when they are passing the other snowmobiles.

One of the biggest differences when riding and snowmobiles/sleds in the group are out of range the external display to passing sleds needs to be stable even if the signal isn't there. In other words, letting the passing sleds stay on high alert that another sled is coming until the last sled is past. In many ways this is more important when the sleds are spaced out then when they are tight together.

According to the disclosure, different colors of lights or a different pattern on a screen can be considered. This could show numbers to indicate number of sleds behind or lines/symbols to indicate number of sleds and then a strong symbol/color to indicate the last sled. Animation can also be used. For example, a flashing light or large flashing green square could indicate you are the last sled in the group. Logical colors would be yellow when there are sleds behind and green for the last rider. In certain situations such as riders with color blindness, other colors or communication means (i.e., audio) can also be considered.

According to the disclosure, one consideration for this handsfree LED feature is automatically creating the order of the group based on comparing signal strength as the sleds pull away from a stop. It isn't uncommon for the order to change throughout a ride, just cycling through different people as leaders, sometimes someone has an issue with their sled behaving funny or their helmet fogging. In certain instances, a rider may be second from last so if they need to stop someone is with them. People who know where they are going may be ahead of people who don't. Faster sledders might be ahead of slower ones. Typically, a change in order happens when the group has come to a stop though so that can be used as a trigger and there could be a manual override if what your sled is saying is incorrect.

According to the disclosure, a manual override interface can be a single button where the riders claim last in the group if it is wrong or saying the rider isn't the last in the group if it is wrong. Furthermore, there could be sled-to-sled communication (i.e., snowmobile to snowmobile communication) to put the correct symbol on the correct sled.

According for further embodiments of the disclosure, the handsfree LED concept may be implemented with an LED light on the back of the snowmobile/sled (i.e., facing oncoming sleds). The light is either green or yellow and is controlled by an easy toggle switch. Everyone in the group can set their lights to yellow except the last person who will set theirs to green. That way, oncoming riders know who is the last person in the group. It should eliminate hand signals so people aren't taking their hands off the handlebars.

Smart Throttle

According to the disclosure, a further feature to consider is a concept of a smart throttle. Most snowmobiles are designed with the right thumb as the throttle control. There are times when the rider unexpectedly hit a bump or go over a drop off. When the snowmobile decelerates after landing or compressing the front suspension, the rider's weight is pushed into handlebars and sometimes the rider inadvertently hits the throttle. This creates a dangerous moment where the rider is out of control.

This scenario is very predictable so it may be possible to change the throttle response in that moment/scenario, effectively cancelling out or dampening the effect of hitting the throttle. The goal is to get the best of both worlds where the rider has a strong throttle response when they want it, while being able to filter out accidental throttle hits.

The smart throttle concept will use such sensors as accelerometers to sense the situation and dampen the throttle response immediately when there is a strong deceleration but not after an extended or slower deceleration. Alternatively, instead of an accelerometers, suspension sensors can be used. In the case where a snowmobile already has suspension sensors for dynamically controlling the suspension dampeners such as Smart Shocks, this type of feature may be integrated into already existing sensors.

Throttle controls may be positioned on the front of the handlebar for activation with the right index finger. On one snowmobile, the throttle can be rotated from thumb control to index finger control. The issue still exists on index finger control but the timing is different on deceleration as the rider weight is pushed into the handlebars and accidentally hit the index finger throttle on the rebound of that where you start to shift your weight back, whereby the accidental response has an extra moment of delay. There could be a sensor which declares to the system where the throttle control is if it is adjustable (most snowmobiles don't have this adjustment) or the delayed response could incorporate the throttle response dampening long enough for the situation to be solved in both these cases.

In addition to bumps, this smart throttle may want to take into account corners. Additional sensors could be steering angle as well as the actual angle the sled is rotating at. The difference being the slip angle, the slip angle changes based on weight distribution, snow conditions and speed. When the sled is turning, there may be bumps or the users grip might slip and they might have an accidental hit on the throttle. The throttle could also have a dynamic element where how much the throttle response is reduced depends on speed, steering angle and slip angle. To calculate steering angle a simple sensor is placed on the steering rack, but to tell the slip angle or the true rotation of the snowmobile, a gyroscope and accelerometer may be considered.

According to the disclosure, the smart throttle feature can be integrated into newer snowmobiles or be purchased as an additional add-on/accessory. The smart throttle feature may not be used by all users and may not be on all the time, so it may be something the user can turn off. Very much like traction control that lets the user have a powerful vehicle while providing some element of safety in certain conditions, Smart Throttle lets you have a lot of torque (fun) while providing a level of safety for accidental activation.

FURTHER EMBODIMENTS

In further embodiments of this disclosure, when a member exits the group, everyone in the group will receive a message, alert or indication with the update. Going in and out of coverage may trigger and update or alert. The system may display the number of people in the group that are currently in range or not in range, but where each rider is their own piece of the mesh network. For example, there are 5 in a group and as the leader gets far ahead, the 5 may drop to 1 because the riders in the group have disconnected from the others. In a further example, if the last person in the group stops then the number would drop from 5 to 4 even though the range may not include all 4 riders.

In further embodiments of this disclosure, the rider's smartphone may be connected to Bluetooth® to provide access to the cell phone network if the signal is available thereby allowing alerts and messaging to be transmitted when out of range. In further embodiments, the system could be integrated into the electronics of a snowmobile or ATV whereby the alerts or warnings generated may be integrated into the snowmobile or ATV information screen.

In further embodiments of this disclosure, the system may provide warning of oncoming objects (e.g., other vehicles). For example, a warning system may be implemented to provide for oncoming sleds, slower traffic ahead or groomers may be presented and processed based on what the user is doing. When the user is travelling at a high rate of speed the warning system should be more sensitive to signals further away when the user is travelling at a low rate of speed. The speed information could come from the gyroscope, GPS, and speedometer, or odometer of the snowmobile. The sensitivity of the warning system may also be based on the trail geometry (e.g., turn down the sensitivity or style of warning when the trail is flat, straight, wide etc.). Knowing the trail geometry may come from trail maps and GPS but it also could be group gathered information with GPS from people snowmobiling.

The use cases or scenarios illustrated in this disclosure are focused primarily for situations where there is no line-of-sight visibility. Accordingly, technologies are chosen that will provide adequate visibility for line of sight such as cameras, GPS and Lidar. According to further embodiments of the disclosure, the system does not require line-of-sight since LoRaWAN®, Bluetooth® and GPS localizations are utilized in detection and distance approximations/calculations.

According to embodiments of this disclosure, a vehicle detection system is disclosed. The vehicle detection is configured to sense obstacles proximate to a vehicle and alert a rider of the vehicle. The vehicle detection system comprises a plurality of alert devices, each alert device mounted on one vehicle.

The alert device further comprises a housing, a processor, a power supply, a wireless alert module configured to enable one or more vehicles to communicate, a display providing a graphical user interface (GUI), an alert module providing a notification; an, an input means on the system configured for the rider to provide input.

The vehicle detection system allows visibility into other riders in the surrounding environment, as well as, those within their riding group and enables the alert device(s) to warn users based on distance and speed of other riders proximate to the vehicle. Furthermore, the system detects other alert devices in the region and use the acquired information to calculate proximity and risk of collision and the alert devices are configured to communicate over one or more mobile ad hoc networks (MANETs).

The vehicle in the vehicle detection system is a snowmobile or an all-terrain vehicle (ATV). The wireless module in the vehicle detection system is selected is from a list consisting of one or more Bluetooth® antenna, a GPS antenna, a GPS receiver, a wireless antenna, a LoRA® transceiver and a BLE transceiver, a LoRaWAN® antenna, a satellite network, a cellular communication system and a mesh network.

The notification of vehicle detection system can be light emitting diodes (LEDs), visual alerts, audible alerts or vibrations. Furthermore, the alert device provides warning of potential collision with another rider.

The input means of vehicle detection system comprises physical buttons or touchscreen buttons on the display. The input means buttons comprise elements chosen from the set of a Power button, a Reset button, a SOS button and a Stop Request button. Pressing the Stop Request button will ask the group to stop or slow down.

When a member exits the group of the vehicle detection system, everyone in the group is configured to receive a message, alerts or indication with this update. The vehicle detection system is configured to detect other alert devices over physical obstacles including hills, around corners, trees and rocks. Furthermore, the alert devices are configured to operate in snow, cold, mud and extreme temperatures and conditions. The alert devices are also configured to support Bluetooth® low energy (BLE) and LoRaWAN® technologies.

The alert device of the vehicle detection system is configured to synchronize data with another vehicle. The alert device further comprising sensors selected from list consisting of gyroscope, GPS, accelerometer and LiDAR.

The power supply of the vehicle detection system is a rechargeable or replaceable battery. The battery further comprises a lithium Thionyl Chloride (Li SOCL2) battery configured to withstand harsh temperatures. The battery is a prismatic battery with dimensions of 37 mm×50 mm×8 mm and provides 2500 mAh.

The vehicle detection system further comprising an LED array and a power management module. The display of the display of the alert device is a 7-segment display.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed:

1. A vehicle detection system, for one or more moving vehicle, configured to sense obstacles proximate to the vehicle and alert a rider of the vehicle, the vehicle detection system comprising:

a plurality of alert devices, each alert device mounted on one vehicle, the alert device further comprising:
- a housing;
- a processor;
- a power supply;
- a wireless alert module configured to enable one or more vehicles to communicate;
- a display providing a graphical user interface (GUI);
- an alert module providing a notification; and
- an input means on the system configured for the rider to provide input;
- one or more sensor configured for range detection;

wherein the alert device allows detection of other riders in the surrounding environment;

wherein the alert device warns users based on distance and speed of the other riders proximate to the vehicle;

wherein the system detects and synchronizes with the other alert devices in the region and use the acquired information to calculate proximity and risk of collision;

wherein the sensors are configured for no line-of-sight visibility utilized for detection and distance calculations using the acquired information to calculate range detection and risk of collision and communicate this information over one or more mobile ad hoc networks (MANETs);

wherein the system further comprising a smart throttle mechanism that uses speed, steering angle and slip angle to dampen a throttle response.

2. The vehicle detection system of claim 1 wherein the vehicle is a snowmobile or an all-terrain vehicle (ATV).

3. The vehicle detection system of claim 1 wherein the wireless module selected is from a list consisting of one or more Bluetooth® antenna, a GPS antenna, a GPS receiver, a wireless antenna, a LoRA® transceiver and a BLE transceiver, a LoRA® antenna, a satellite network, a cellular communication system and a mesh network.

4. The vehicle detection system of claim 1 wherein the notification can be light emitting diodes (LEDs), visual alerts, audible alerts or vibrations.

5. The vehicle detection system of claim 1 wherein the alert device provides warning of potential collision with another rider.

6. The vehicle detection system of claim 1 wherein the input means further comprises physical buttons or touch-screen buttons on the display.

7. The vehicle detection system of claim 6 wherein the input means further comprises a Power button, a Reset button, a SOS button and a Stop Request button.

8. The vehicle detection system of claim 7 wherein pressing the Stop Request button will ask the group to stop or slow down.

9. The vehicle detection system of claim 1 wherein when a member exits the group, everyone in the group is configured to receive a message, alerts or indication with this update.

10. The vehicle detection system of claim 1 is configured to detect other alert devices over physical obstacles including hills, around corners, trees and rocks.

11. The vehicle detection system of claim 1 wherein the alert devices are configured to operate in snow, cold, mud and extreme temperatures and conditions.

12. The vehicle detection system of claim 1 wherein the alert devices are configured to support Bluetooth® low energy (BLE) and LoRaWAN® technologies.

13. The vehicle detection system of claim 1 wherein the alert device configured to synchronize data with another vehicle.

14. The vehicle detection system of claim 1 wherein the alert device further comprising sensors selected from list consisting of gyroscope, GPS, accelerometer and LiDAR.

15. The vehicle detection system of claim 1 wherein the power supply of the alert device is a rechargeable or replaceable battery.

16. The vehicle detection system of claim 15 wherein the battery further comprises a lithium Thionyl Chloride (Li SOCL2) battery configured to withstand harsh temperatures.

17. The vehicle detection system of claim 15 wherein the battery is a prismatic battery with dimensions of 37 mm×50 mm×8 mm and provides 2500 mAh.

18. The vehicle detection system of claim 1 further comprising an LED array, a 7-segment display and a power management module.

19. An alert device mounted on a vehicle and configured to sense obstacles proximate to a vehicle and alert a rider of the vehicle, the alert device comprising:

a housing;

a processor;

a power supply;

a wireless alert module configured to enable one or more vehicles to communicate;

a display providing a graphical user interface (GUI);

one or more sensor configured for range detection;

an alert module providing a notification; and an input means on the alert device configured for the rider to provide input;

wherein the alert device allows detection of other riders in the surrounding environment;

wherein the alert device warns users based on distance and speed of the other riders proximate to the vehicle;

wherein the alert device detects and synchronizes with the other alert devices in the region and use the acquired information to calculate proximity and risk of collision;

wherein the sensors are configured for no line-of-sight visibility utilized for detection and distance calculations using the acquired information to calculate range detection and risk of collision and communicate this information over one or more mobile ad hoc networks (MANETs);

wherein the alert device further comprising a smart throttle mechanism that uses speed, steering angle and slip angle to dampen a throttle response.

20. A method of detecting obstacles proximate to a vehicle and alerting a rider of the vehicle, the method comprising the steps:

powering on an alert device mounted on the vehicle;

searching for other alert devices mounted on other vehicles nearby;

detecting other alert devices indicating that other vehicles are nearby;

providing a notification on a display of the alert device of the status of the other vehicle;

providing one or more sensor configured for range detection;

wherein the alert device allows visibility of other riders in the surrounding environment;

wherein the alert device warns users based on distance and speed of other riders proximate to the vehicle;

wherein the alert device detects and synchronizes with the other alert devices in the region and use the acquired information to calculate proximity and risk of collision;

wherein the sensors are configured for no line-of-sight visibility utilized for detection and distance calculations using the acquired information to calculate range detection and risk of collision and communicate this information over one or more mobile ad hoc networks (MANETs);

wherein the method further comprising a smart throttle mechanism that uses speed, steering angle and slip angle to dampen a throttle response.

* * * * *